United States Patent
Sakamaki et al.

[11] Patent Number: 6,128,604
[45] Date of Patent: Oct. 3, 2000

[54] CARD HOLDER

[75] Inventors: Teruo Sakamaki; Hideo Hiramatsu, both of Tokyo, Japan

[73] Assignee: Dai Nippon Printing Co., Ltd., Tokyo, Japan

[21] Appl. No.: 08/933,360

[22] Filed: Sep. 18, 1997

[30]     Foreign Application Priority Data

Sep. 19, 1996  [JP]  Japan .................................. H8-248370
Sep. 11, 1997  [JP]  Japan .................................. H9-246324

[51] Int. Cl.⁷ .................................................... G06F 17/60
[52] U.S. Cl. .......................... 705/41; 235/375; 235/380; 235/384; 235/492; 235/441; 379/91; 379/266
[58] Field of Search .................................. 705/41, 14, 35; 235/375, 380, 384, 441, 492, 438; 379/91, 266

[56]                 References Cited

U.S. PATENT DOCUMENTS

| | | | |
|---|---|---|---|
| 4,931,623 | 6/1990 | Nakamura et al. ...................... | 235/438 |
| 4,998,753 | 3/1991 | Wichael ..................................... | 283/82 |
| 5,015,830 | 5/1991 | Masuzawa et al. ...................... | 235/441 |
| 5,382,781 | 1/1995 | Inoue ....................................... | 235/384 |
| 5,406,064 | 4/1995 | Takahashi ................................ | 235/492 |
| 5,436,436 | 7/1995 | Matsukawa .............................. | 235/380 |
| 5,445,199 | 8/1995 | Jia ............................................ | 150/136 |
| 5,541,985 | 7/1996 | Ishii et al. ................................ | 379/111 |
| 5,698,837 | 12/1997 | Furuta ..................................... | 235/492 |
| 5,729,000 | 3/1998 | Sugimoto ................................ | 235/441 |
| 5,729,717 | 3/1998 | Tamada et al. .......................... | 711/164 |

FOREIGN PATENT DOCUMENTS

| | | |
|---|---|---|
| 2 635 211 | 2/1990 | France . |
| 2 286 948 | 8/1995 | United Kingdom . |

*Primary Examiner*—Allen R. MacDonald
*Assistant Examiner*—Romain Jeanty
*Attorney, Agent, or Firm*—McDermott, Will & Emery

[57]                 ABSTRACT

A card holder allows the bearer of an IC card to check the information recorded in the IC card at any time and with ease even if the IC card has a surface that is not fit to be provided with a display portion that allows repeated writing and erasing of information. The card holder has a card holding means, a reading means for reading information from the IC card held by the card holding means, and a display means.

4 Claims, 12 Drawing Sheets

CARD HOLDER

BACKGROUND OF THE INVENTION

1. Field of the Invention

The present invention relates to a card holder.

2. Description of the Prior Art

As is widely known, IC cards provide a large storage capacity and a high degree of security, and, for this reason, IC cards have in recent years attracted much attention as a new information storage medium to replace conventional magnetic cards. In fact, IC cards have been finding more and more applications lately. For example, IC cards are used as premium point cards to record premium points that are given to a card bearer in accordance with the amount of his or her purchase and are exchangeable with goods or services in accordance with the number of accumulated points, or as rental cards to record information related to rented CDs, videocassettes, or other, or as prepaid cards.

However, to see the information recorded in an IC card, a set of specialized equipment including a card reader and a display device is required, and, in general, a card bearer does not own such equipment, much less carries it around for his or her shopping. Accordingly, a card bearer usually cannot readily see the information recorded in an IC card, and this has been causing various inconveniences. For example, in the case of a premium point card, which is first and foremost intended to motivate the card bearer to buy more, the card does not serve the purpose unless the card bearer can readily recognize how many premium points have been accumulated.

To overcome such inconveniences, a type of IC card has been proposed whose surface is provided with a display portion that allows repeated writing and erasing of information through application of heat or a magnetic field. This type of IC card allows the data recorded therein to be displayed on the display portion, and thus allows the card bearer to see the information recorded in the card with ease. However, it is difficult to provide such a display portion for some types of card such as credit cards in which a membership number or other information is embossed on the surface.

SUMMARY OF THE INVENTION

An object of the present invention is to provide a card holder that allows the bearer of an IC card to see the information recorded in the IC card at any time and with ease even if the IC card is of a type whose surface is not fit to be provided with a display portion that allows repeated writing and erasing of information.

To achieve the above object, according to one aspect of the present invention, a card holder is provided with a plurality of card holding means; reading means for reading information from an IC card held by at least one of the card holding means; display means; and display control means for displaying the information read by the reading means on the display means.

According to another aspect of the present invention, a card holder for holding a plurality of cards to be carried around has adequate flexibility and is provided with a plurality of card holding means; reading means, provided in one of the plurality of card holding means, for reading information from an IC card; display means; and display control means for displaying the information read by the reading means on the display means.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, embodiments of the present invention will be described with reference to the drawings.

Figure 1:
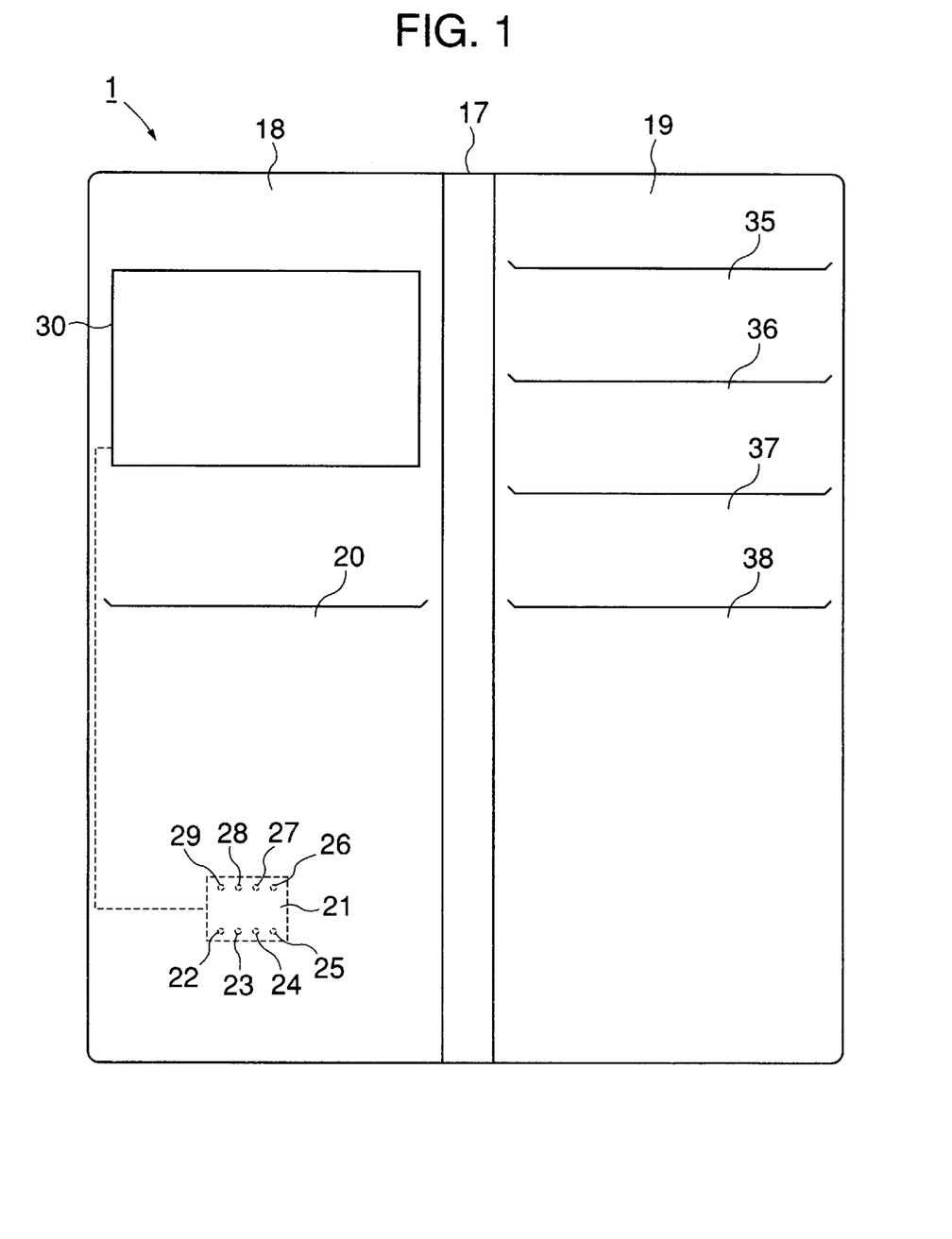
FIG. 1 is a diagram showing the appearance of the card holder of a first embodiment of the present invention, in its unfolded state.
Figure 7:
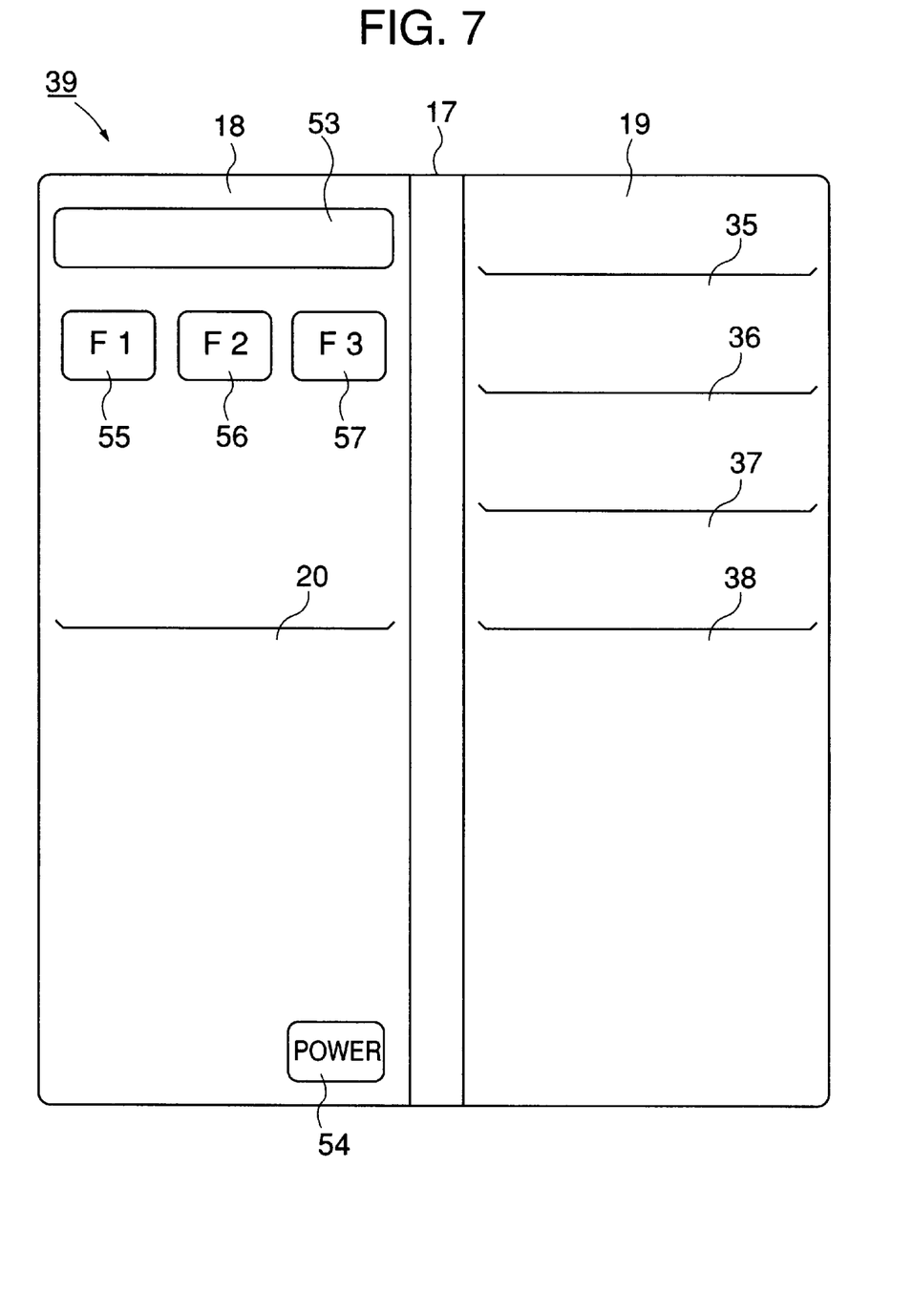
FIG. 7 is a diagram showing the appearance of the card holder of a second embodiment of the present invention, in its unfolded state.

FIG. 1 shows the card holder of a first embodiment of the present invention, in its unfolded state, and FIG. 7 shows the card holder of a second embodiment of the present invention. In both of these embodiments, the IC cards used with the card holder are multifunctional cards serving as rental cards to record information related to rented CDs, videocassettes, or other (e.g. rented titles, rental charges, and rental terms), as credit cards, as prepaid cards for rental charges, and as premium point cards to record premium points that are given to the card bearer in accordance with the amount of money he or she has paid for the rental or purchase of CDs, videocassettes, books, or other and that entitle the card bearer to the discount of rental charges or can be exchanged with goods or services in accordance with the number of accumulated points.

Such IC cards are first and foremost intended to motivate the card bearer to use the cards more willingly by giving the card bearer premium points in accordance with the amount paid for the rental or purchase of goods, and thus contribute to the promotion of sales effectively. To promote sales further, it is possible even to give more premium points to bearers of an IC card than to those who rent or purchase goods by cash or on credit without using an IC card, or to give IC card bearers discount in accordance with the amount paid. Moreover, these cards are designed to be usable also as credit cards so that the card bearer can conveniently purchase goods on credit at the shop of the card issuer and at any shop tied up with the same credit company.

Furthermore, by using the data to identify the card bearer (ID data) not only as the ID data but also as the customer ID number of credit contracts and as the personal ID data for rental shops, it is possible to use the storage area of the IC chip of an IC card effectively. Note that, in the lower part of the surface of these IC cards, the membership number, the name, and other pieces of information are embossed. It is also possible to provide the IC card with a portion in which data can be stored magnetically so that the above-mentioned ID data is stored not in the IC chip but in this magnetic data storage portion.

Figure 2:
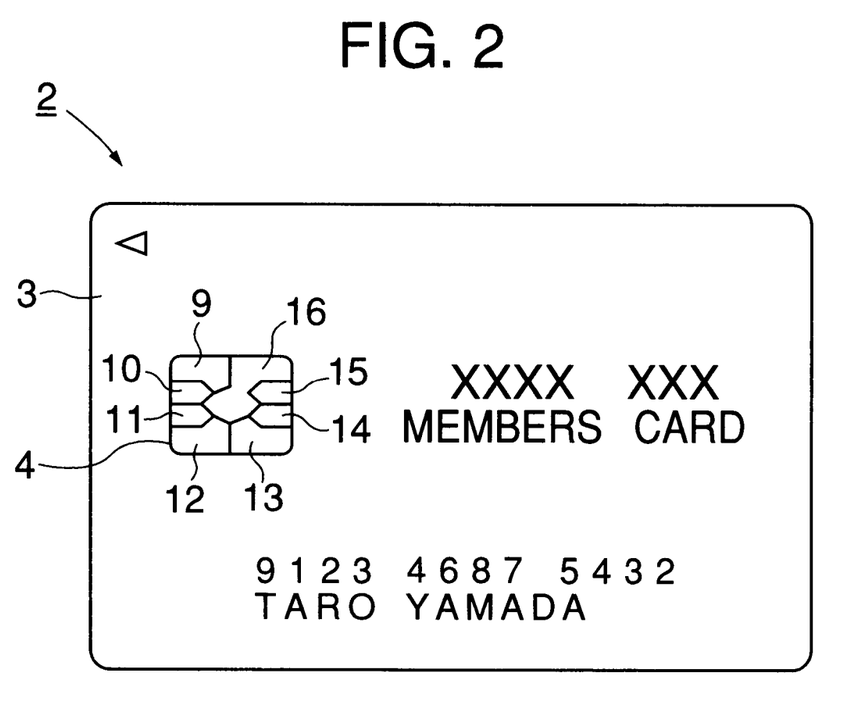
FIG. 2 is a plan view of an IC card used with the card holder of the first embodiment.
Figure 3:
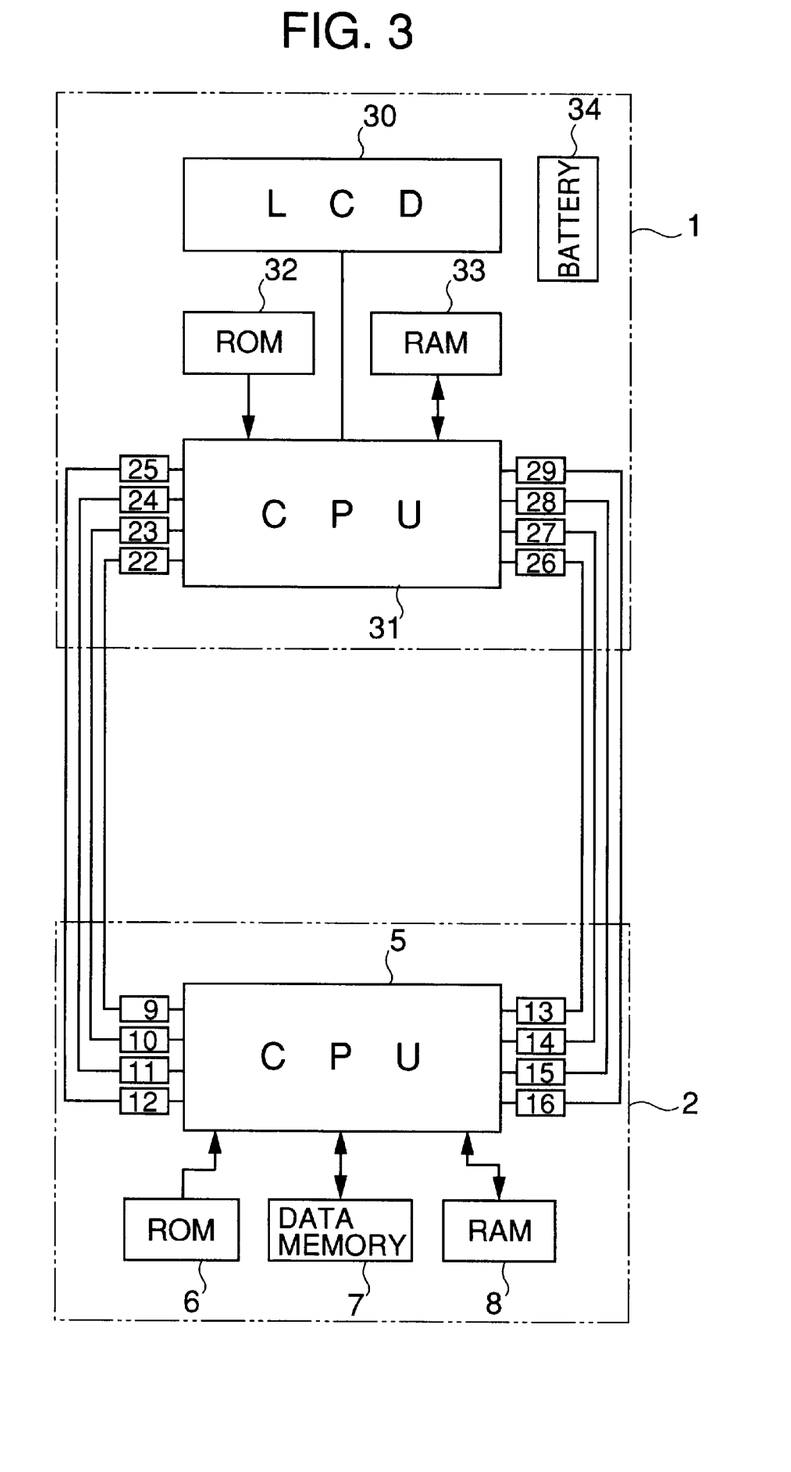
FIG. 3 is a block diagram showing the electrical construction of the card holder and the IC card of the first embodiment.

FIG. 2 shows an IC card 2 of a contact type that is used with the card holder 1, shown in FIG. 1, of the first embodiment. This IC card 2 is provided with a printed circuit board (not shown) on which electronic components such as an IC chip are mounted, and a card base 3 made of synthetic resin that covers the surface of the printed circuit board. On the surface of the card base 3, a terminal section 4 is provided that allows access to the IC chip from the outside. The terminal section 4 has eight contacts 9 to 16, of which two are for supplying power, one is for ground connection, one is for communicating data, one is for supplying a clock signal, one is for supplying a reset signal, and two are reserved for future extension. As shown in FIG. 3, the IC card 2 incorporates a CPU 5, a ROM 6 for storing programs, a data memory 7 composed of an electrically rewritable memory such as an EEPROM or FRAM, and a RAM 8 used as a work area.

The card holder 1, shown in FIG. 1, of the first embodiment is made of leather, synthetic leather, cloth, soft synthetic resin, or other, and, as shown in FIG. 1, is provided with an outer lining 17 that is square-shaped and adequately flexible, a first card holding section 18 that is square-shaped and adequately rigid and that is sewn onto the inner surface of the outer lining 17 to cover the left-hand half thereof almost completely, and a second card holding section 19 that is square-shaped and adequately rigid and that is sewn onto the inner surface of the outer lining 17 to cover the right-hand half thereof almost completely. When the card holder 1 is folded along its center line in such a way that the first and second card holding sections 18 and 19 are put together, the card holder 1 becomes small enough to be put into a pocket in the coat or trousers of a suit.

The first card holding section 18 is provided with a card holding pocket 20 for holding an IC card 2. The card holding pocket 20 is approximately the same size as the IC card 2, and incorporates a terminal plate 21 having terminals 22 to 29 that are put in contact with the contacts 9 to 16 of the IC card 2 when the IC card 2 is inserted into the card holding pocket 20. The terminals 22 to 29 are connected to the later-described CPU 31 provided in the card holder 1.

Moreover, as shown in FIGS. 1 and 3, the first card holding section 18 has, in its upper part, a liquid crystal display (hereinafter referred to as the LCD) 30 serving as a display means, and incorporates electronic components such as a CPU 31, a ROM 32 for storing programs, a RAM 33 used as a work area, and a battery 34 for supplying electric power to those components. As the battery 34, a lithium battery is used. Furthermore, it is advisable to apply a reinforcement plate made of plastic, metal, or other to the back surface of the LCD 30, because the LCD 30 is easily damaged by a mechanical shock.

The terminal plate 21, the CPU 31, and the programs stored in the ROM 32, among others, constitute a reading means for reading information from the IC card 2. On the other hand, the CPU 31 and the programs stored in the ROM 32, among others, constitute a display control means for displaying the information read from the IC card 2 on the LCD 30.

Figure 12:
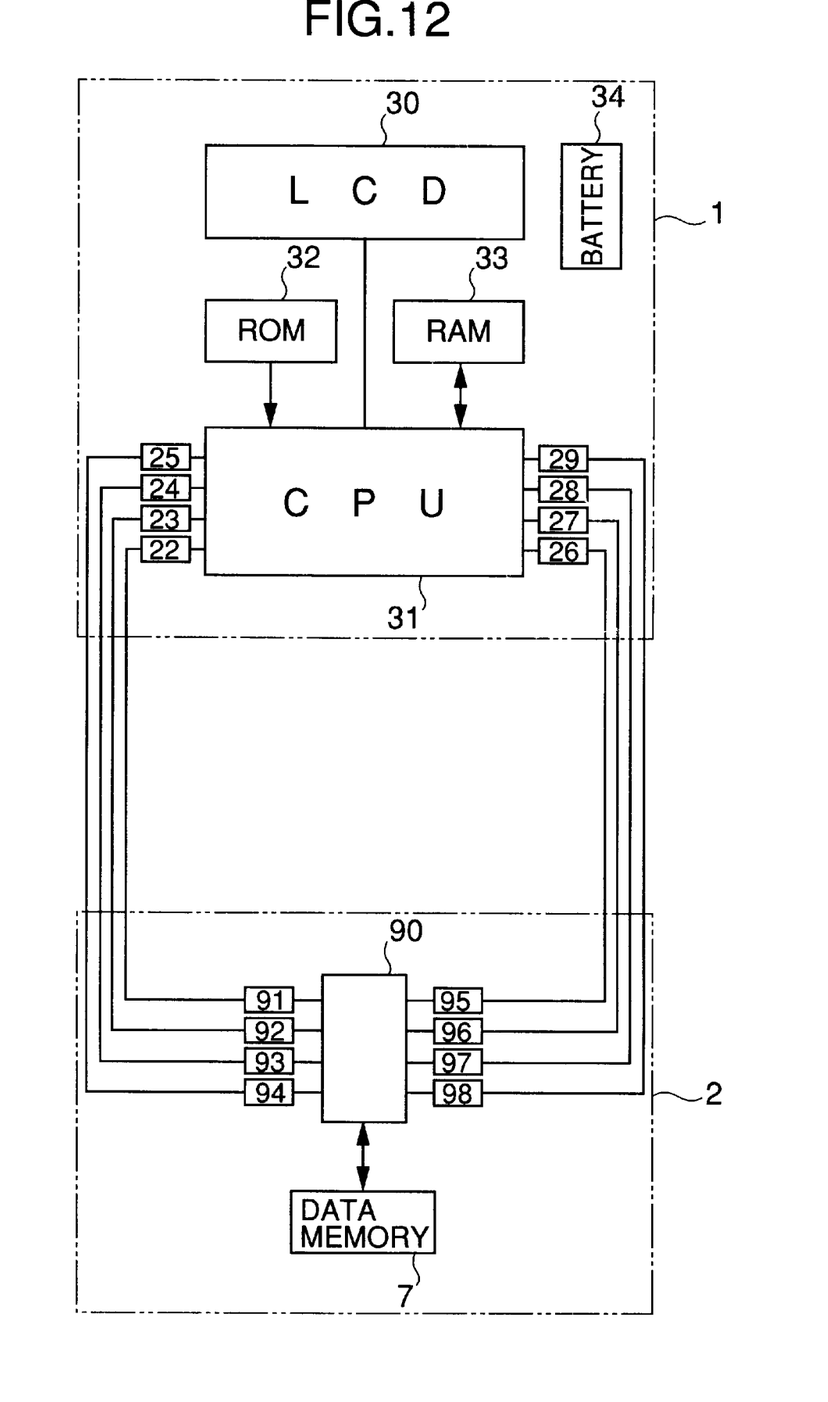
FIG. 12 is a block diagram showing a modified example of the electrical construction of an IC card used in the first embodiment.

Although the IC card 2 of the first embodiment incorporates a CPU, it is also possible to use an IC card, as shown in FIG. 12, that does not have a CPU and serves simply as a memory (this type of IC card 2 is connected to the card holder 1 via the contacts 91 to 98 of a connector 90). Moreover, it is possible to omit the ROM or the RAM depending on the uses of the IC card The second card holding section 19, having an opening along its left-hand edge, is envelope-shaped, so that a section (not shown) for holding sheet-shaped objects such as commutation tickets, receipts, and cash dispenser bills is formed inside. The second card holding section 19 is sewn onto the outer lining 17 along its top, bottom, and right-hand edges, so that a section (not shown) for holding paper money (here, paper money includes negotiable securities such as checks) is formed between them. The second card holding section 19 is provided with card holding pockets 35 to 38, arranged vertically at equal intervals, for holding cards such as magnetic cards and commutation tickets.

Figure 11:
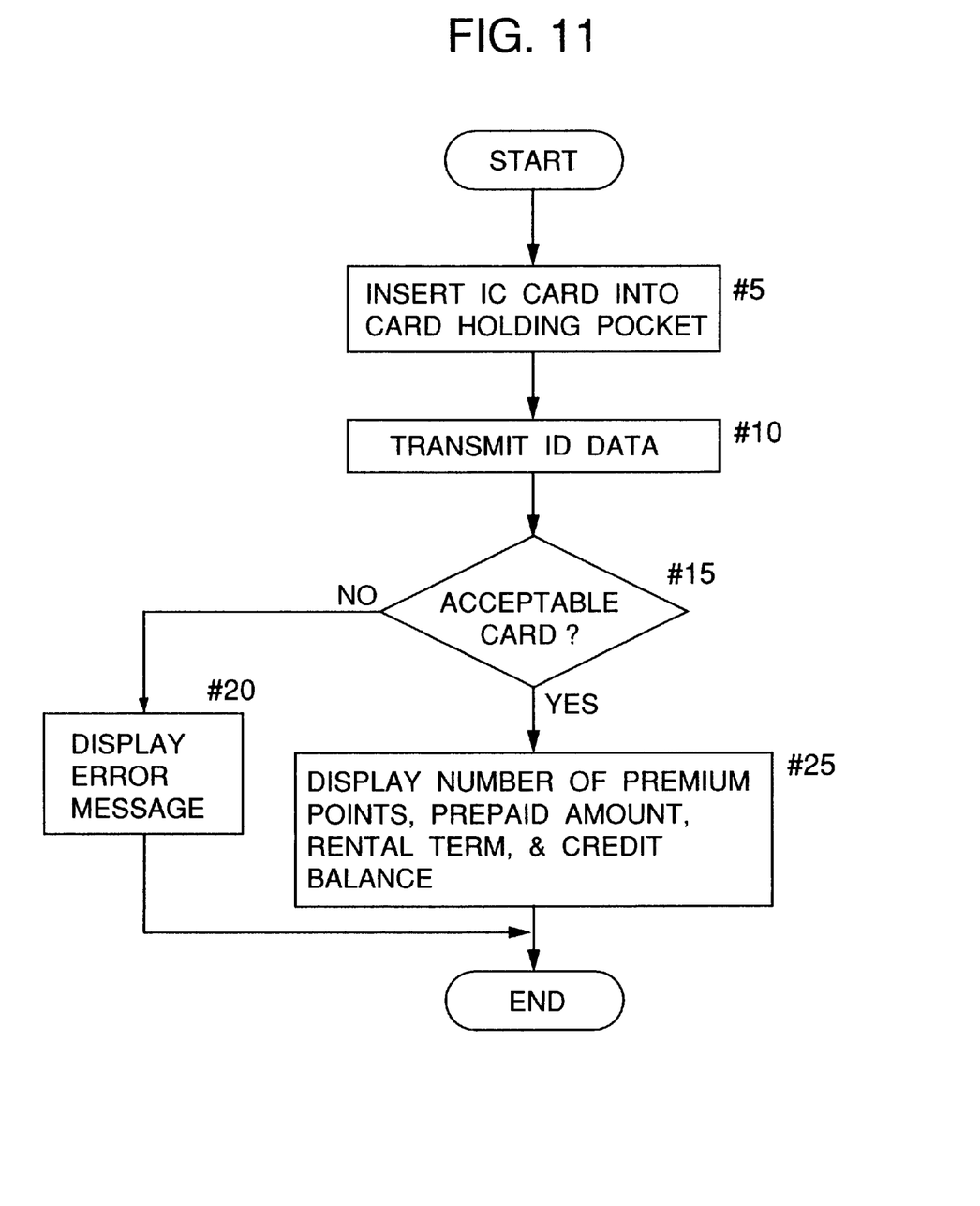
FIG. 11 is a flowchart showing the operation of the card holder of the first embodiment.

Next, the operation of the card holder 1 and the IC card 2 of the first embodiment will be described below with reference to the flowchart shown in FIG. 11.

When a bearer of an IC card requests rental of a CD or videocassette at a rental shop, the IC card 2 is inserted in a terminal device installed at the shop. The terminal device transmits rental information such as the title of the CD or videocassette, the article number, the rental charge, and the rental term to the IC card 2, and the CPU 5 of the IC card 2 stores the received information in a predetermined area of the data memory 7. In addition, the terminal device reads the number of accumulated premium points and the remaining prepaid amount recorded in the data memory of the IC card 2, calculates the number of premium points that should be given to the card bearer in accordance with the rental charge and adds the calculated number to the accumulated number, deducts the rental charge from the remaining prepaid amount, and transmits the updated number of premium points and remaining prepaid amount to the IC card 2. Then, the CPU 5 of the IC card 2 updates the number of accumulated premium points and the remaining prepaid amount recorded in the data memory 7 with those transmitted from the terminal device.

When the IC card 2 is inserted into the card holding pocket 20 of the card holder 1 (step #5), the contacts 9 to 16 of the IC card 2 are respectively put in contact with the terminals 22 to 29 of the terminal plate 21, and electric power is supplied from the battery 34 of the card holder 1 to the CPU 5, ROM 6, data memory 7, and RAM 8 of the IC card 2. Next, the CPU 31 of the card holder 1 transmits ID data for checking whether the IC card 2 is acceptable or not (step #10), and the CPU 5 of the IC card 2 stores the received data in the RAM 8. Note that, in reality, the terminals 22 to 29 are connected to the CPU 31 not directly but through an I/O (input/output) circuit, but the I/O circuit is omitted in FIG. 3.

Figure 4:
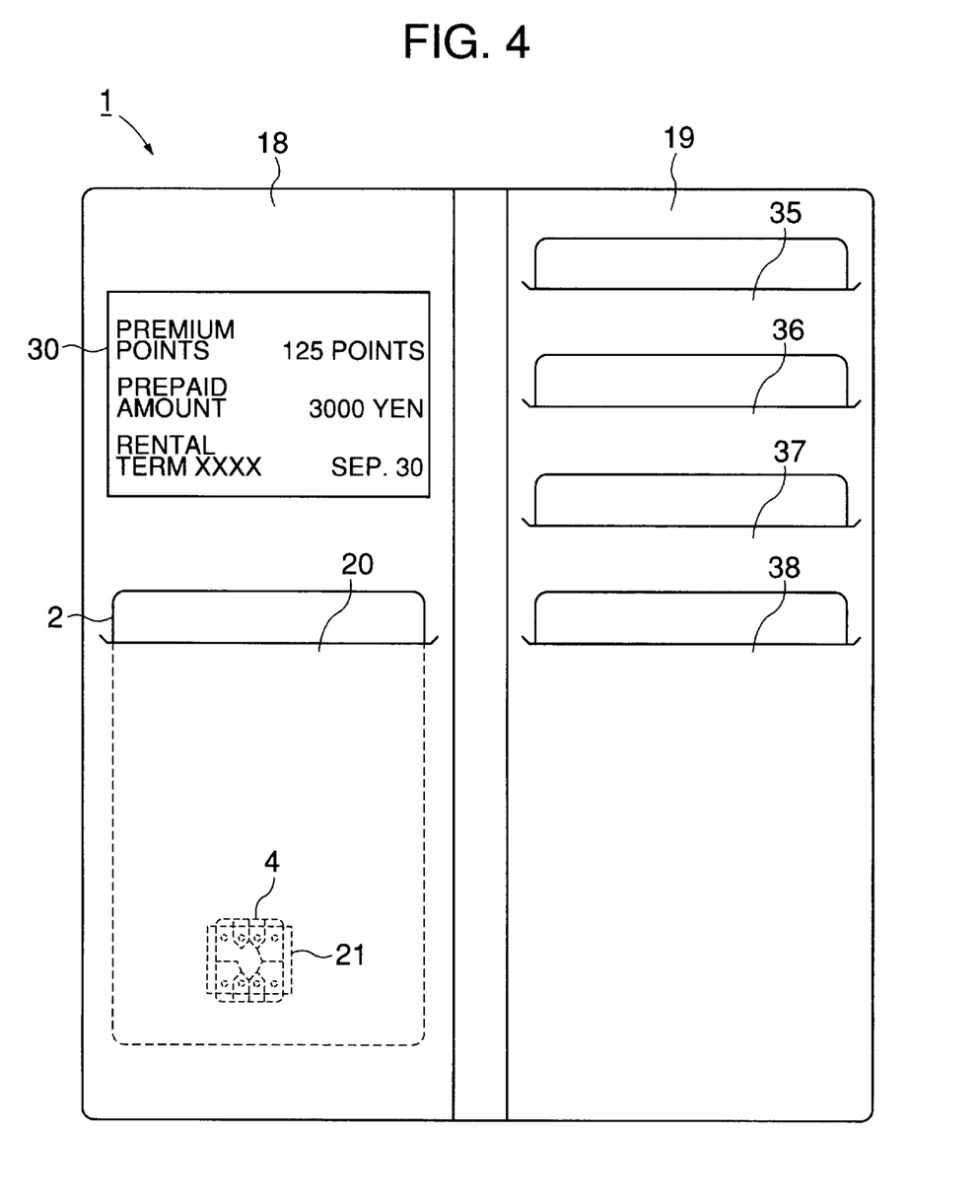
FIG. 4 is a diagram showing an example of the use of the card holder of the first embodiment.

The CPU 5 reads the ID data that is stored in the data memory 7 beforehand, and checks it against the ID data stored in the RAM 8 to check whether the IC card 2 is acceptable or not (step #15). If the IC card 2 is found to be not acceptable, the CPU 5 of the IC card 2 notifies the CPU 31 of the card holder 1 that a wrong IC card is inserted. On receiving the notification, the CPU 31 displays an error message on the LCD 30 (step #20) to notify the card bearer that a wrong IC card is inserted. If, in step #15, the IC card 2 is found to be acceptable, the CPU 5 of the IC card 2 reads the number of accumulated premium points, the remaining prepaid amount, and the rental term recorded in the data memory 7, and transmits them to the CPU 31 of the card holder 1. The CPU 31 first stores the received information in the RAM 33, and then displays it on the LCD 20 (step #25) as shown in FIG. 4.

Figure 5:
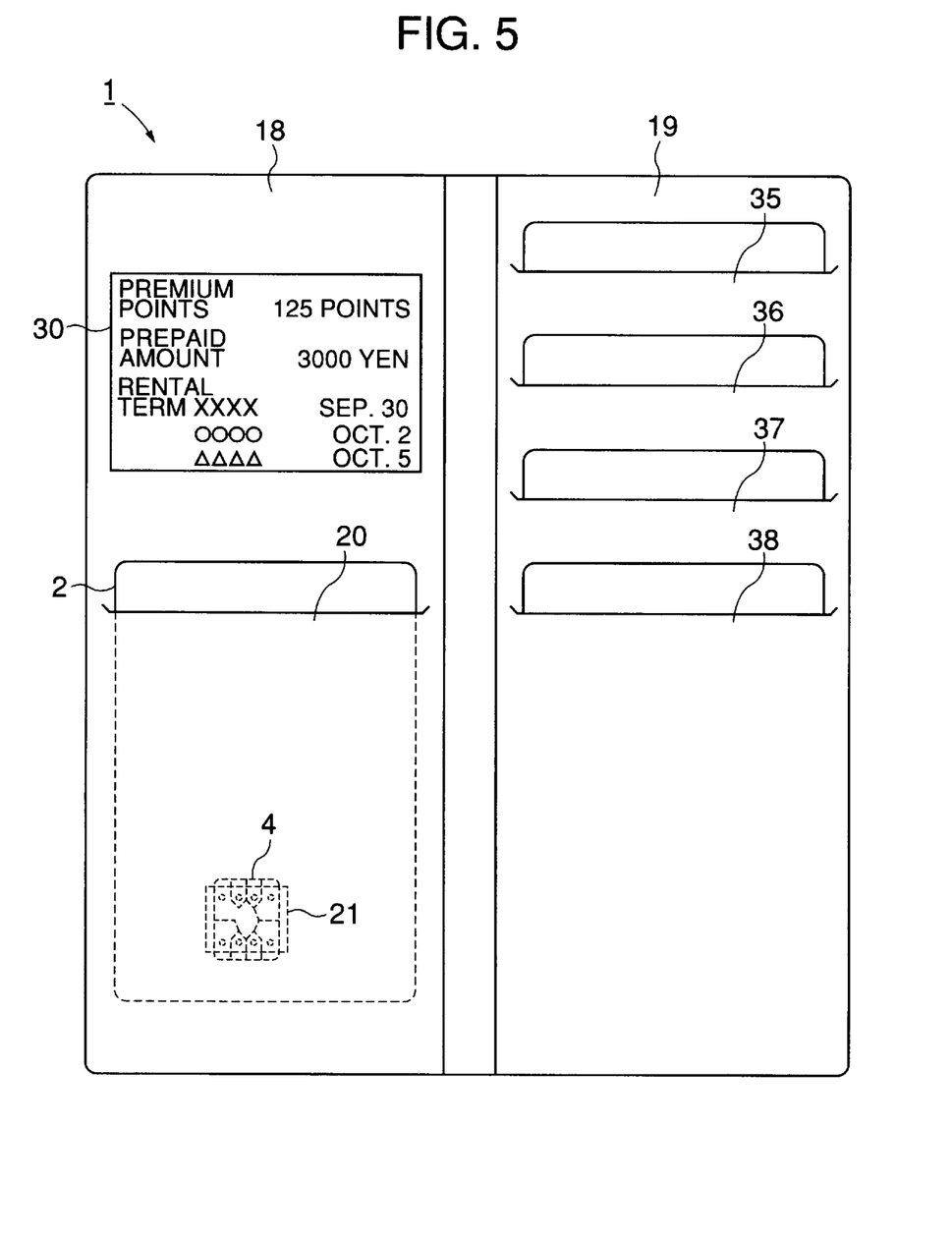
FIG. 5 is a diagram showing another example of the use of the card holder of the first embodiment.
Figure 6:
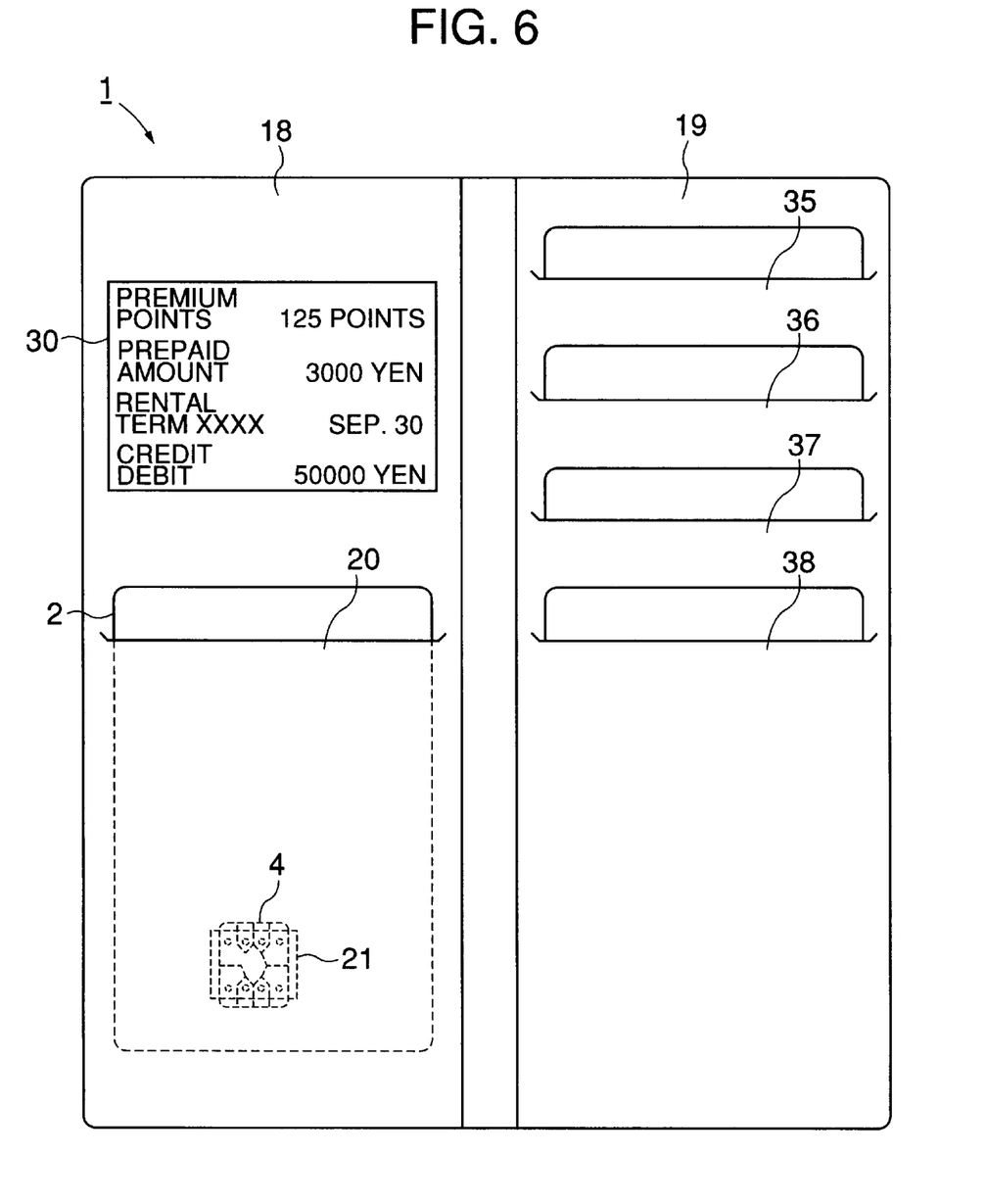
FIG. 6 is a diagram showing still another example of the use of the card holder of the first embodiment.

The IC card 2 is capable of recording rental information as to more than one rental article, and accordingly, as shown in FIG. 5, the card holder 1 is capable of displaying the article name, article number, and rental term on an article-by-article basis. Moreover, as shown in FIG. 6, when the IC card 2 is of the type that can be used also as a credit card, the card holder is capable of displaying the current balance of the credit account as well as (although not shown) the number of accumulated premium points that are given to the card bearer in accordance with the amount of payment on credit. These items of information may be displayed on the LCD 30 all at the same time, or item by item. In the latter case, the card holder 1 needs to be additionally provided with a key for switching the items displayed on the LCD 30.

When there is no need to see the information recorded in the IC card 2, it is preferable to move the IC card 2 to one of the card holding pockets 35 to 38 of the second card holding section 19 in order to reduce meaningless consumption of the power of the battery 34. However, it is also possible to design the card holding pocket 20 in such a way that, when the IC card 2 is inserted therein, there is a space between the terminal plate 21 of the card holding pocket 20 and the surface of the terminal section 4 of the IC card 2, and, when the portion just behind the terminal plate 21 of the card holding pocket 20 is pressed with a finger, the terminals 22 to 29 of the terminal plate 21 are put into contact with the contacts 9 to 16 of the terminal section 4. Alternatively, it is also possible to provide the card holder 1 with a push-button switch or the like for turning the power on and off, or to provide it with a power key as shown in FIG. 7, which will be described later.

Next, a second embodiment of the present invention will be described. Note that, in the following descriptions and in the figures related thereto, such components as are found also in the first embodiment are identified with the same designations, and overlapping explanations will not be repeated.

Figure 8:
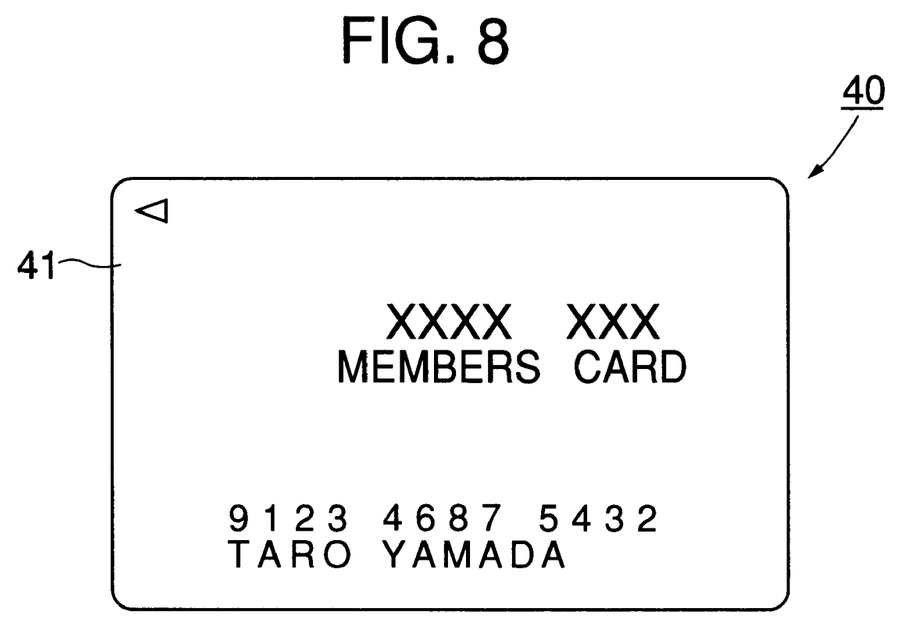
FIG. 8 is a plan view of an IC card used with the card holder of the second embodiment.

FIG. 8 shows an IC card 40 of a non-contact type that is used with the card holder of the second embodiment. This IC card 40 is composed of a flexible printed circuit board (not shown) on which electronic components such as ICs are mounted, and a card base 41 for covering the surface thereof. The card base 41 has antennas 201 and 209 embedded in it, which will be described later.

The card holder 39, shown in FIG. 7, of the second embodiment is provided with a reader/writer (indicated by numeral 90 in FIG. 9) for writing data to and reading data from the IC card 40 (more precisely, its data memory 205) inserted in a card holding pocked 20. Typically, this reader/writer 90 is provided with a capability to exchange data with a higher-level data processor 98, and accordingly it is provided with an interface controller 99 for controlling communication with the higher-level data processor 98, in addition to a controller 100, a parallel/serial converter 101, an oscillator 102, a modulator 103, a transmitting antenna (transmitter) 104, a receiving antenna (receiver) 105, a demodulator 106, and a serial/parallel converter 107.

The card holder 39 has, in the upper part of the first card holding section 18, a laterally extending LCD (liquid crystal display) 53, and, in the lower part of the first card holding section 18, a sheet-type power key 54. Further, the card holder 39 has, below the LCD 53, sheet-type selection keys 55 to 57 for selecting the items displayed on the LCD 53.

Next, how data is written to and read from the card 40 through the reader/writer 90 will be described.

<Operation for Writing Data>

Figure 9:
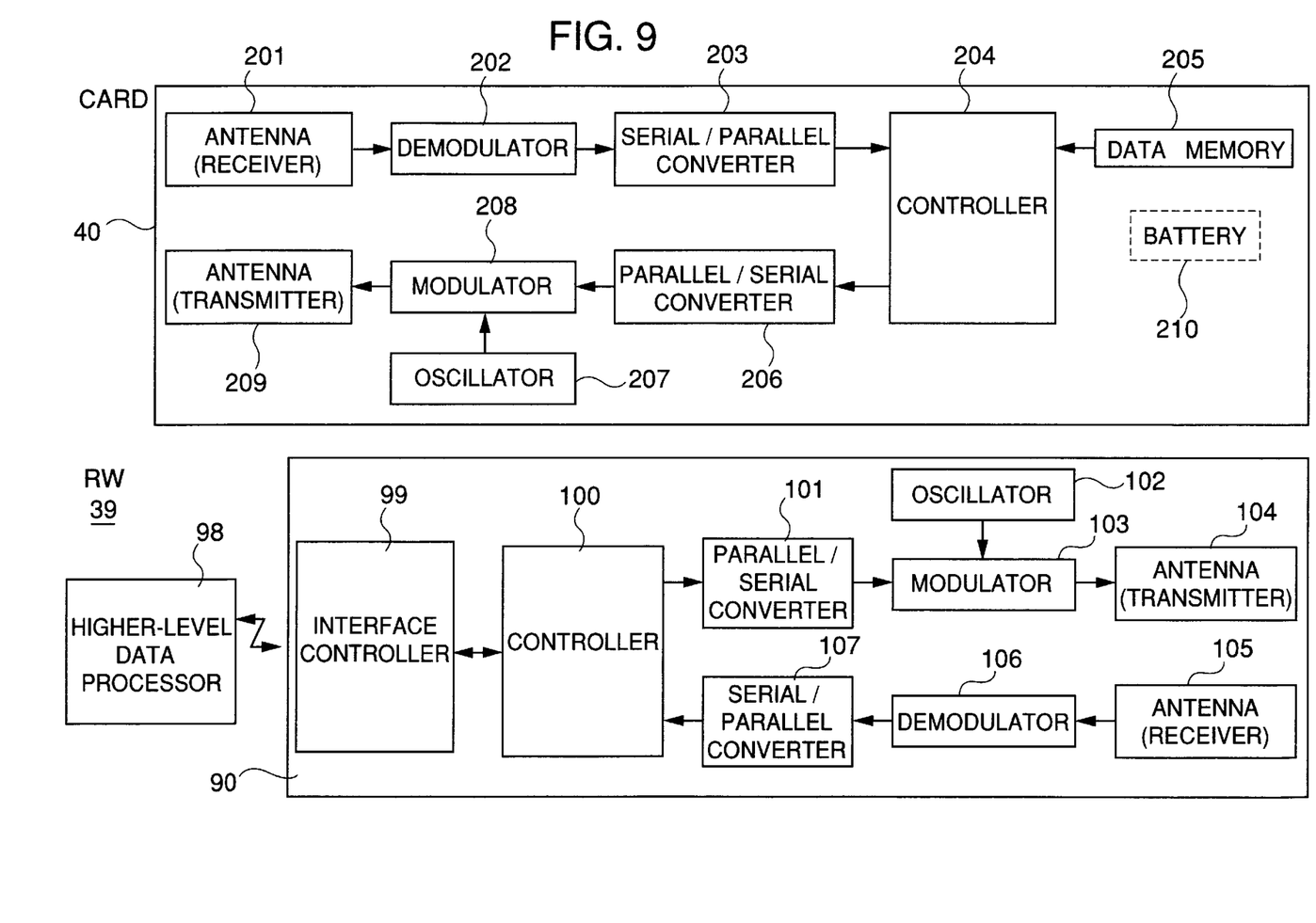
FIG. 9 is a block diagram showing the electrical construction of the card holder and the IC card of the second embodiment.

First, a write instruction and information received from the higher-level data processor 98 are converted to a serial signal by the parallel/serial converter 101 of the reader/writer 90. Subsequently, a radio-frequency signal outputted from the oscillator 102 is digitally modulated (ASK modulation) by the serial signal, and is then power-amplified and supplied to the antenna (transmitter) 104. As a result, through magnetic induction, a signal that is identical to the signal applied to the antenna (transmitter) 104 is induced at the antenna (receiver) 201 of the card 40. The induced signal is amplified within the card 40, and is then demodulated to the original two-value serial signal by the demodulator 202. Thereafter, this serial signal is converted to parallel signals by the serial/parallel converter 203, and is then processed by the controller 204 to discriminate between the write instruction and the information and store only the information in the data memory 205.

<Operation for Reading data>

First, a read instruction is transmitted from the reader/writer 90 to the card 40. When the controller 204 of the card 40 detects the read instruction transmitted from the antenna (transmitter) 104 of the reader/writer 90, it reads out information from that area of the data memory 205 which is specified by the read instruction. The resulting parallel information signals are converted to a serial signal by the parallel/serial converter 206. Subsequently, the serial signal is modulated by the modulator 208, and is then power-amplified and supplied to the antenna (transmitter) 209. Then, just as when a write operation is performed, through magnetic induction, a signal identical to the signal fed to the antenna (transmitter) 209 of the card is induced at the antenna (receiver) 104 of the reader/writer 90. The induced signal is demodulated to the original digital information by the demodulator 106 of the reader/writer 90.

The controller 204 shown in FIG. 9 may be realized as a microcomputer including a CPU, a ROM, and a RAM as shown in FIG. 3, or may simply be constituted of logic circuits or the like.

Figure 10:
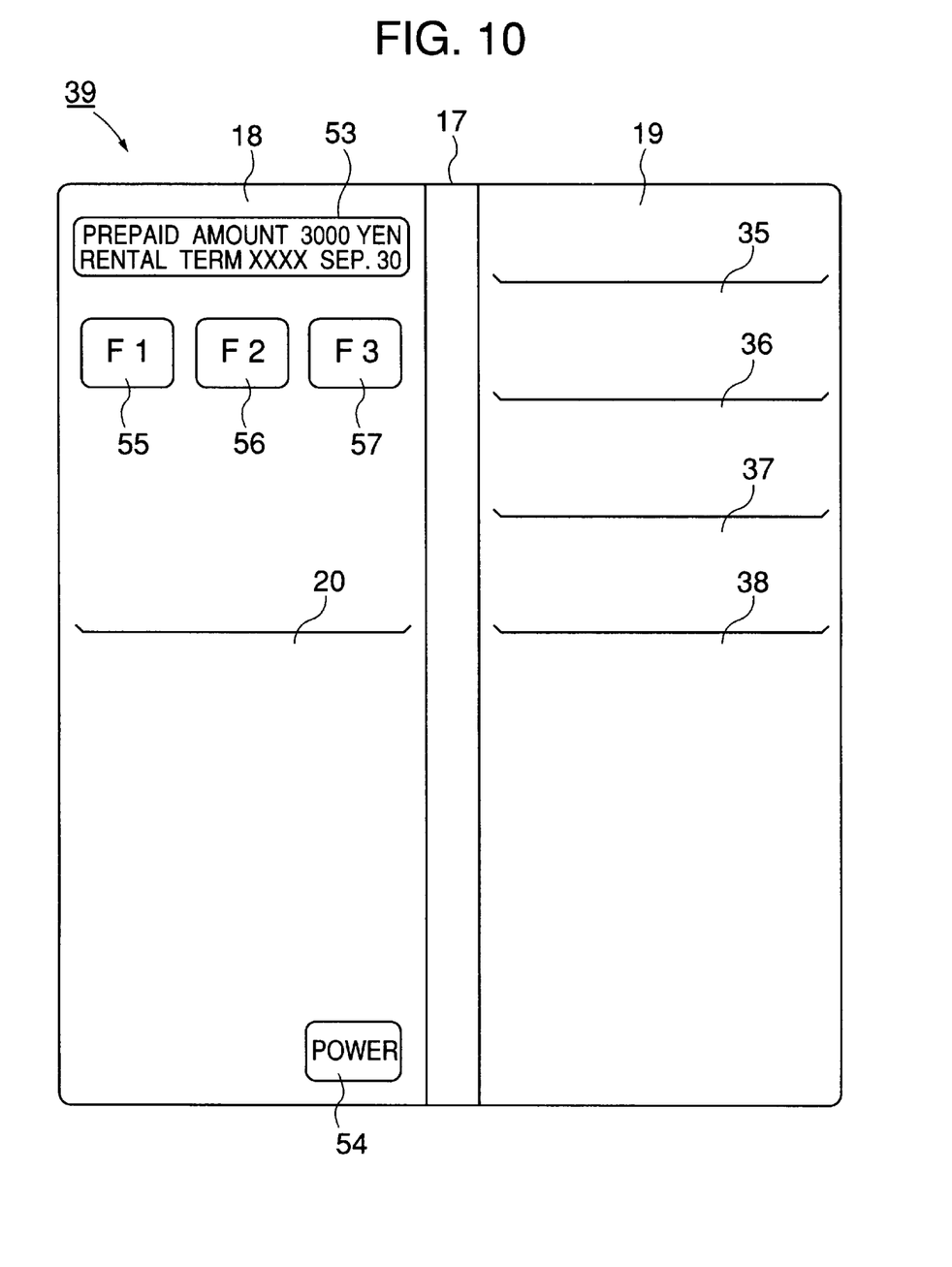
FIG. 10 is a diagram showing an example of the use of the card holder of the second embodiment.

As shown in FIG. 10, the controller 100 of the card holder 39 displays the remaining prepaid amount and the rental term on the LCD 53. When the selection key 56 is pressed, the LCD 53 displays the number of accumulated premium points; when the selection key 57 is pressed, the LCD 53 displays the current state of the credit account; when the selection key 55 is pressed, the LCD 53 displays the remaining prepaid amount and the rental term again.

In this way, by allowing selection of information displayed on the LCD 53 by the use of the selection keys 55 to 57, it is possible to reduce the area of the LCD 53 without sacrificing the capability of displaying various items of information. This helps make the card holder smaller and thus more portable. Further, by the use of an appropriate program, it is also possible to display information at regular time intervals.

A card holder according to the present invention provides the bearer of an IC card with easy access to the information recorded in the IC card, and thus allows the IC card to serve its intended purpose fully. For example, in the case of a premium point card, since the card holder allows the card bearer to check the number of accumulated premium points at any time, it motivates the card bearer to buy more, and thus contributes to the promotion of sales. Moreover, since the card holder displays only the information recorded in a specific brand of card, it motivates the card bearer to use the card of that brand more willingly than other cards even if the bearer owns more than one IC card.

The application of the present invention is not limited to embodiments as described above, and therefore it is possible to record any kind of data in the IC card, and to display any kind of data on the display means of the card holder. For example, it is possible to use a card holder of the present invention to display information recorded in premium point cards and prepaid cards issued by department stores, supermarkets, shopping centers, and the like, or parking-related information such as parking times and parking spaces recorded in bulk payment cards issued by parking lots, or medical information such as consultation dates and consulted divisions recorded in registration cards issued by hospitals. Moreover, it is possible to display on the display means even information as to new rental CD and video titles or announcements of premiums that are offered in exchange for particular numbers of premium points in order to motivate the members of a rental shop to rent more; it is also possible to display the name or membership number of a member to make it easy for the member to confirm whether or not an IC card really belongs to him or her.

Moreover, the IC card and the card holder may be constructed differently from the way they are constructed in the above-described embodiments. For example, it is possible to employ IC cards that do not have a CPU. Furthermore, the present invention will find a wider range of applications if it is applied to cards such as MULTOS®/IC cards and Java® cards in which the OS (operating system) is specialized for use in IC cards so as to absorb differences in hardware.

As described above, a card holder according to the present invention allows the bearer of an IC card to check the information recorded in the IC card at any time and with ease even if the IC card has a surface that is not fit to be provided with a display portion that allows repeated writing and erasing of visual information. Moreover, the card holder allows more information to be displayed in a wider area in a more legible way than cards provided with a display portion. Moreover, the card holder, by providing the card bearer with easy access to the information recorded in an IC card, allows the IC card to serve its intended purpose fully, that is, motivates the card bearer to use the IC card more willingly. Furthermore, the card holder makes it unnecessary to install devices for displaying the information recorded in IC cards at shops.

By designing the card holder to be foldable along its center line with the display means inside, it is possible to enhance its portability as well as to protect the display means against mechanical shocks.

By providing the card holder with a cash holding means, it is possible to use it as a wallet that can be carried around all the time by the card bearer, and thus it is possible to promote the use of IC cards.

By providing the card holder with a sheet holding means, it is possible to use it as a pass holder or the like, and thus it is possible to promote the use of IC cards.

By designing the card holder in such a way that its display control means selects among a plurality of sets of information to be displayed on its display means, it is possible to display a plurality of sets of information recorded in an IC card. This also contributes to the reduction of the area of the display means, and thus to the reduction of the size of the card holder.

What is claimed is:

1. A card holder comprising:
    a plurality of card holding means, each of which is capable of holding an IC card;
    reading means for reading information from an IC card held by one of the card holding means;
    display means;
    display control means for displaying the information read by the reading means on the display means; and
    a terminal plate accessible by the user, said terminal plate having a plurality of terminals which align with corresponding contacts provided on a terminal section of said IC card when said IC card is placed in said card holding means comprising said reading means, said terminal section provided on a front surface of said IC card;
    said terminals of said terminal plate being brought into contact with said contacts of said terminal section by exerting a force on said terminal plate.

2. A card holder according to claim 1, wherein a power source is supplied to said IC card only when said force is exerted on said terminal plate such that said terminals of said terminal plate contact said contacts of said terminal section.

3. A card holder for holding a plurality of cards to be carried around, said card holder having adequate flexibility and comprising:
    a plurality of card holding means, each of which is capable of holding an IC card;
    reading means, provided in one of the plurality of card holding means, for reading information from an IC card;
    display means;
    display control means for displaying the information read by the reading means on the display means; and
    a terminal plate accessible by the user, said terminal plate having a plurality of terminals which align with corresponding contacts provided on a terminal section of said IC card when said IC card is placed in said card holding means comprising said reading means, said terminal section provided on a front surface of said IC card; and
    said terminals of said terminal plate being brought into contact with said contacts of said terminal section by exerting a force on said terminal plate.

4. A card holder according to claim 3, wherein a power source is supplied to said IC card only when said force is exerted on said terminal plate such that said terminals of said terminal plate contact said contacts of said terminal section.

* * * * *